United States Patent
Migault

(12) 
(10) Patent No.: US 9,130,990 B2
(45) Date of Patent: *Sep. 8, 2015

(54) SERVER AND METHOD FOR MANAGING DOMAIN NAMES IN A NETWORK USING A ZONE FILE WITH A RULE PARTITIONING SUBDOMAINS INTO SUBZONES

(75) Inventor: Daniel Migault, Issy les Moulineaux (FR)

(73) Assignee: ORANGE, Paris (FR)

( * ) Notice: Subject to any disclaimer, the term of this patent is extended or adjusted under 35 U.S.C. 154(b) by 851 days.

This patent is subject to a terminal disclaimer.

(21) Appl. No.: 12/300,939

(22) PCT Filed: May 10, 2007

(86) PCT No.: PCT/FR2007/051244
§ 371 (c)(1),
(2), (4) Date: Nov. 14, 2008

(87) PCT Pub. No.: WO2007/132112
PCT Pub. Date: Nov. 22, 2007

(65) Prior Publication Data
US 2009/0113075 A1    Apr. 30, 2009

(30) Foreign Application Priority Data

May 17, 2006    (FR) ..................... 06 51792

(51) Int. Cl.
*G06F 15/16* (2006.01)
*G06F 15/177* (2006.01)
*G06F 15/173* (2006.01)
*H04L 29/12* (2006.01)

(52) U.S. Cl.
CPC ...... *H04L 61/1511* (2013.01); *H04L 29/12066* (2013.01); *H04L 29/12283* (2013.01); *H04L 61/2061* (2013.01)

(58) Field of Classification Search
CPC ............... H04L 29/12066; H04L 61/1511; H04L 61/2061; H04L 29/12283
USPC .......................................... 709/245, 217–228
See application file for complete search history.

(56) References Cited

U.S. PATENT DOCUMENTS

| | | | |
|---|---|---|---|
| 6,701,329 B1 * | 3/2004 | Esibov et al. | 709/226 |
| 6,961,783 B1 * | 11/2005 | Cook et al. | 709/245 |
| 6,976,090 B2 * | 12/2005 | Ben-Shaul et al. | 709/246 |
| 7,188,138 B1 * | 3/2007 | Schneider | 709/203 |
| 7,426,576 B1 * | 9/2008 | Banga et al. | 709/245 |
| 7,680,955 B2 * | 3/2010 | Huang et al. | 709/245 |
| 2002/0010798 A1 * | 1/2002 | Ben-Shaul et al. | 709/247 |
| 2004/0044791 A1 * | 3/2004 | Pouzzner | 709/245 |

(Continued)

OTHER PUBLICATIONS

Faltstrom, P., Cisco Systems Inc., Sep. 2000, IETF RFC 2916 (9 pages).

(Continued)

*Primary Examiner* — Haresh N Patel
(74) *Attorney, Agent, or Firm* — Knobbe Martens Olson & Bear LLP

(57) ABSTRACT

A domain name server includes a zone file containing partitioning rules that define the partitioning of all subfolders of this domain into subzones. The DNS data of each of these subzones is hosted by a partition server that is able to obtain from the zone file information for identifying the partition server able to respond to a query sent by a client to obtain a DNS folder.

10 Claims, 2 Drawing Sheets

(56) References Cited

U.S. PATENT DOCUMENTS

| | | | |
|---|---|---|---|
| 2004/0194102 A1* | 9/2004 | Neerdaels | 718/100 |
| 2005/0182781 A1* | 8/2005 | Bouvet | 707/102 |
| 2006/0031514 A1* | 2/2006 | Bousis | 709/227 |
| 2006/0265516 A1* | 11/2006 | Schilling | 709/245 |
| 2006/0282327 A1* | 12/2006 | Neal et al. | 705/14 |
| 2007/0043829 A1* | 2/2007 | Dua | 709/219 |
| 2009/0187649 A1* | 7/2009 | Migault et al. | 709/223 |
| 2009/0319690 A1* | 12/2009 | Shuster et al. | 709/245 |
| 2010/0054222 A1* | 3/2010 | Rune | 370/338 |

OTHER PUBLICATIONS

Brown Nortel Networks et al., "ENUM Service Reference Model", IETF Standard-Working-Draft, Internet Engineering Task Force, vol. enum, No. 2, Feb. 23, 2001, XP015018188, pp. 1-32.

Mealling Verisign, "Dynamic Delegation Discovery System (DDDS) Part Three: The Domain Name System (DNS) Database", IETF Standard, Internet Engineering Task Force, IETF, Oct. 2002, XP015009158, pp. 1-16.

Austrian ENUM Trial Platform, "Austrian ENUM Trial Service Definition Document Version 0.1", Austrian ENUM Trial, pp. 1-11, May 19, 2003, XP002420647, http://enum.nic.at/documents/AETP/Permanent_Documents/Draft/0011-Austrian_ENUM_Trial_Service Definitivev0.0.doc>.

Mockapetris Isi P: "Domain Names—Concepts and Facilities", IETF Standard, Internet Engineering Task Force, IETF, Nov. 1987, XP015005973, pp. 1-58.

* cited by examiner

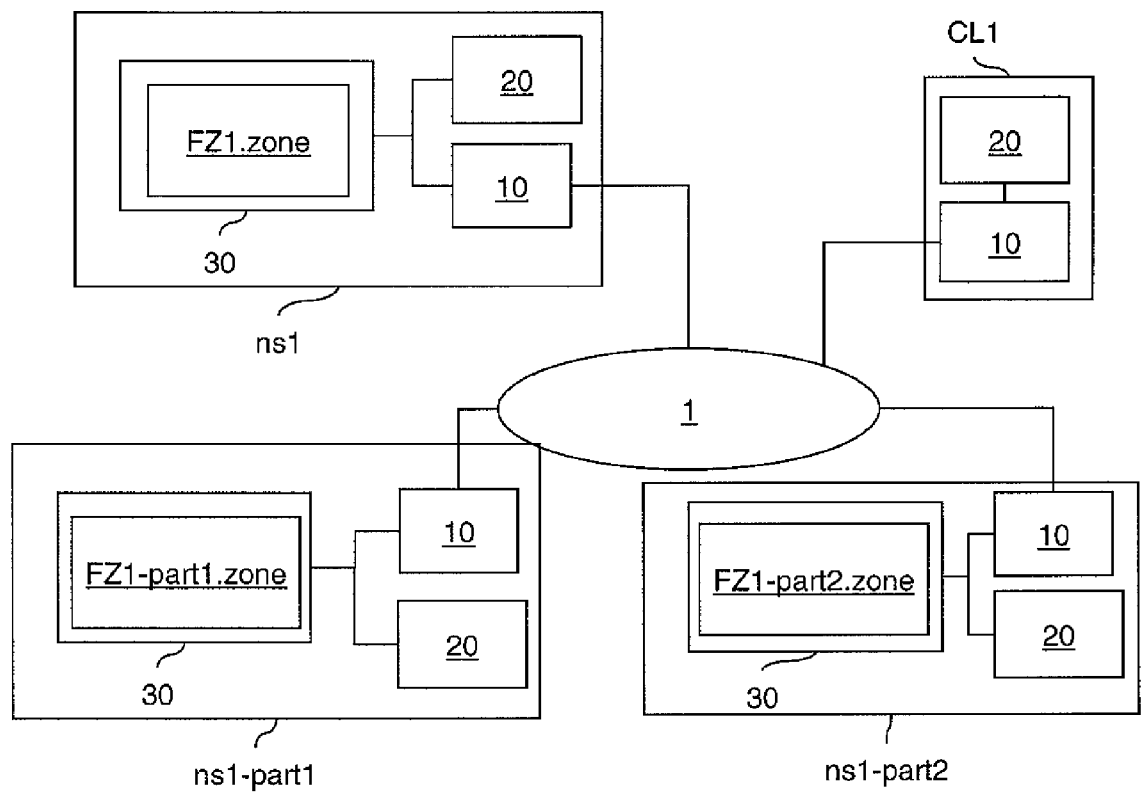
FIG. 2
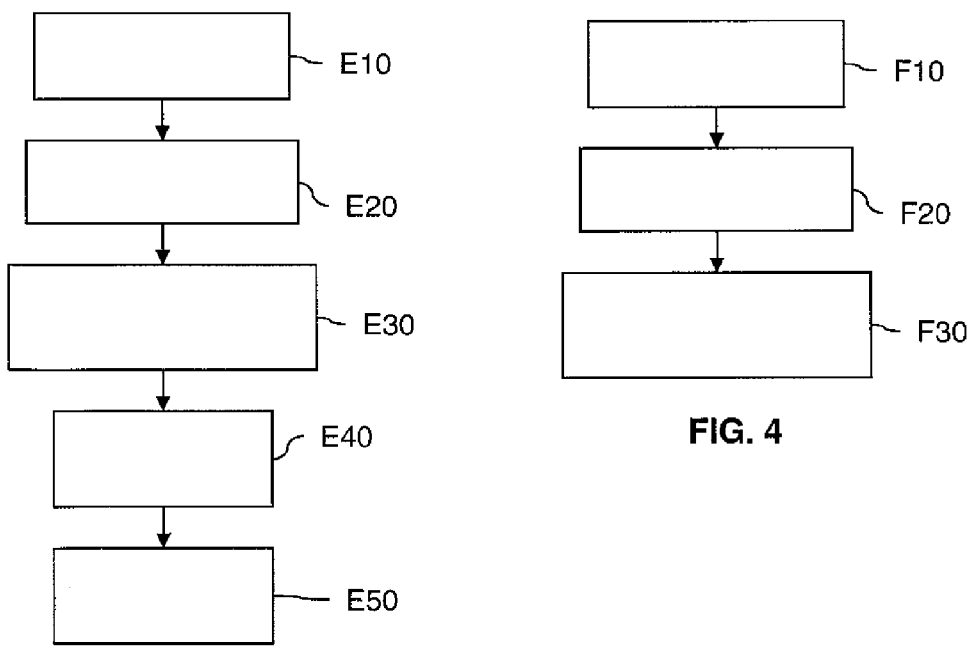
FIG. 3
FIG. 4

SERVER AND METHOD FOR MANAGING DOMAIN NAMES IN A NETWORK USING A ZONE FILE WITH A RULE PARTITIONING SUBDOMAINS INTO SUBZONES

RELATED APPLICATIONS

This is a U.S. National Phase Application under 35 USC §371 of International Application PCT/FR2007/051244, filed on May 10, 2007.

This application claims the priority of French application no. 06/51792 filed on May 17, 2006, and the content of which is hereby incorporated by reference.

BACKGROUND OF THE INVENTION

The present invention relates to the general field of domain name servers in a telecommunications network. The Domain Name System (DNS) architecture defined by the Internet Engineering Task Force (IETF) Request For Comments (RFC) 1034 manages domain names in a network.

This architecture introduces the domain concept to designate a group of machines on the network.

FIG. 1 represents an architecture of this kind. The domains .,.fr,.com, ft.com, and rd.ft.com contain subdomains.

For example, the domain ft.com includes three subdomains www.ft.com, rd.ft.com, and user.ft.com.

The domains that are underlined in FIG. 1 are known as terminal domains. A terminal domain:
- can represent one or more physical machines, like the terminal domain www.rd.ft.com, for example;
- but can also not represent any physical machine, like the terminal domain user.ft.com, for example, which here consists of personal information of the person specified by "user".

A domain that includes one or more subdomains is associated with a domain server, also referred to as a name server.

The domain server includes a zone file.

The domains are logically linked, so that DNS data of any domain can be obtained by interrogating the name servers progressively, starting with the root server.

In the present document, the term information refers in particular to the IP (Internet Protocol) address of a domain, a text zone, or any field (CNAME, etc.) associated with a domain.

With the growing popularity of the Internet, domain name servers are increasingly difficult to administer.

In particular, update operations, which are additional to the traditional reading operations (directory function), considerably increase the number of transactions managed by these servers. Moreover, these transactions require operations to synchronize master and slave servers and also consume network resources.

Also, domain name servers host increasingly large amounts of data and increasingly large zones.

Previously, domain names contained hardly more information than IP addresses, not exceeding around twenty bytes. Nowadays, the DNS hosts much larger profiles (approximately 200 bytes), for example ENUM services (as described in IETF RFC 2916).

One known solution to this problem is to create subdomains, the name servers of the subdomains created in this way hosting some of the data previously hosted by the domain from which they originate.

That solution adds another level to the domain hierarchy, however, which complicates the new subdomain name.

This complexity of the subdomain name can be perceived as a drawback, especially if the name of the subdomain is used for commercial or advertising purposes.

OBJECT OF THE INVENTION

The invention aims to address the above problem.

To this end, a first aspect of the invention proposes a domain server in a telecommunications network, adapted to manage DNS queries relating to the domain, including means for receiving from a client device a query seeking to obtain DNS data of that domain. The server includes:
- a zone file containing a partitioning rule defining a partitioning of the set of subdomains of the domain into subzones, the DNS data of each of the subzones being hosted by a partition server;
- means for obtaining from the zone file sufficient information to identify the appropriate partition server capable of responding to the query; and
- mean for sending the useful information to the client device in response to the query.

The term "zone" is generally used to refer to data hosted by a server and the term "domain" to designate the logical entity. However, the terms "zone" and "domain" are often used interchangeably in the literature.

In the remainder of this document, in the context of the invention, the partition servers are child servers of the domain name server, also known as the parent server.

Thus the invention hosts the data of a domain in child servers that defines the partitioning of the subdomains of that domain.

The parent server can retain some of the data of its domain, of course.

The person skilled in the art will understand that it is not a question of the same zone being managed in its entirety by a number of servers, which is already provided for by the DNS, but rather of fragmenting a domain into small zones that are more easily administered by the domain name servers.

In particular, the invention dissociates the logic for managing the data of a domain from its use, which is highly advantageous.

A feature in an embodiment of the invention resides in the zone file read by the server. Thus a second aspect of the invention is directed to a data structure having a computer file that can be read by a domain server in a telecommunications network and includes:
- lines defining a rule for partitioning the set of subdomains of the domain into subzones; and
- lines including identifiers of partition servers each hosting the DNS data of one of said subzones.

In practice, the administrator of a zone defines the logical partitioning of a domain, which amounts to dividing the subdomains of that domain into different groups, each group being hosted either by a child server or by the parent server itself.

The computer file of the invention contains mainly a list of partition server identifiers (i.e. child servers and where appropriate parent server) and a partitioning rule used to identify a particular partition server adapted to supply the required DNS data.

The useful information sent back by the server for redirecting its client can be of various types.

For example, it can include one or more of the following:
- the partitioning rule(s) accompanied by the names or aliases of the partition servers;
- the name of the appropriate partition server; and
- an alias of the appropriate partition server.

If the useful information consists of the partitioning rule, either the client device or its administrator must interpret the partitioning rule to determine the name of the partition server.

A third aspect of the invention is directed to a client data processing system of a domain name server in a telecommunications network, including means for sending said server a query seeking to obtain DNS data of that domain. This client data processing system includes means for interpreting a regular expression received in response to the query, this interpretation enabling it to obtain the name of a partition server capable of responding to the query.

Once it knows the name or alias of the partition server, the client device can interrogate that server to obtain the required data, proceeding step by step as is usual in the DNS architecture.

The useful information preferably further includes the address of the partition server, associated with one or more of the above elements.

In a preferred embodiment, the partitioning rule for identifying the partition server is a regular expression and the domain name server includes means for interpreting that regular expression to obtain the address of the partition server and send it to the client device.

A regular expression can be defined as a line of computer code defining the search for a pattern within a character string.

This particularly advantageous feature greatly facilitates the task of users having no client device of the invention adapted to interpret regular expressions.

Another aspect of the invention relates to a method of managing DNS queries relating to a domain in a telecommunications network, including a step of receiving from a client device a query seeking to obtain DNS data of that domain.

The method includes:
 a step of reading a zone file including a partitioning rule defining partitioning of the set of the subdomains of the domain into subzones, the DNS data of each of the subzones being hosted by a partition server;
 a step of obtaining from the zone file sufficient information to identify the partition server capable of responding to said query; and
 a step of sending said useful information to the client device in response to the query.

Another aspect of the invention is directed to a method of obtaining DNS data of a domain in a telecommunications network, including a step of sending a query aiming to obtain the data.

This method includes a step of interpreting a regular expression received in response to the query and obtaining from that interpretation the name of a partition server capable of responding to the query.

The steps of the management method and the method of obtaining data are preferably determined by computer program instructions.

Another aspect of the invention is directed to a computer program on an information medium, adapted to be executed in a computer, a domain name server or a client device, and including instructions adapted to execute a domain name management method or a method of obtaining data as outlined above.

These programs can use any programming language and take the form of source code, object code or an intermediate code between source code and object code, such as a partially-compiled form, or any other desirable form.

Another aspect of the invention is directed to a computer-readable information medium that can also be read by a domain name server and contains instructions of a computer program as referred to above.

The information medium can be any entity or device capable of storing the program. For example, the support can include storage means, such as a ROM, for example a CD ROM or a microelectronic circuit ROM, or magnetic storage means, for example a diskette (floppy disk) or a hard disk.

Moreover, the information medium can be a transmissible medium such as an electrical or optical signal, which can be routed via an electrical or optical cable, by radio or other means. The program of the invention can in particular be downloaded over an Internet-type network.

Alternatively, the information medium can be an integrated circuit into which the program is incorporated, the circuit being adapted to execute the method in question or to be used in its execution.

BRIEF DESCRIPTION OF THE DRAWINGS

Other features and advantages of the present invention emerge from the description given below with reference to the appendices and drawings, which show one non-limiting embodiment of the invention and in which:

Appendices 1 and 2 represent the principal lines of a zone file of a parent domain name server in two embodiments of the invention;

Figure 1:
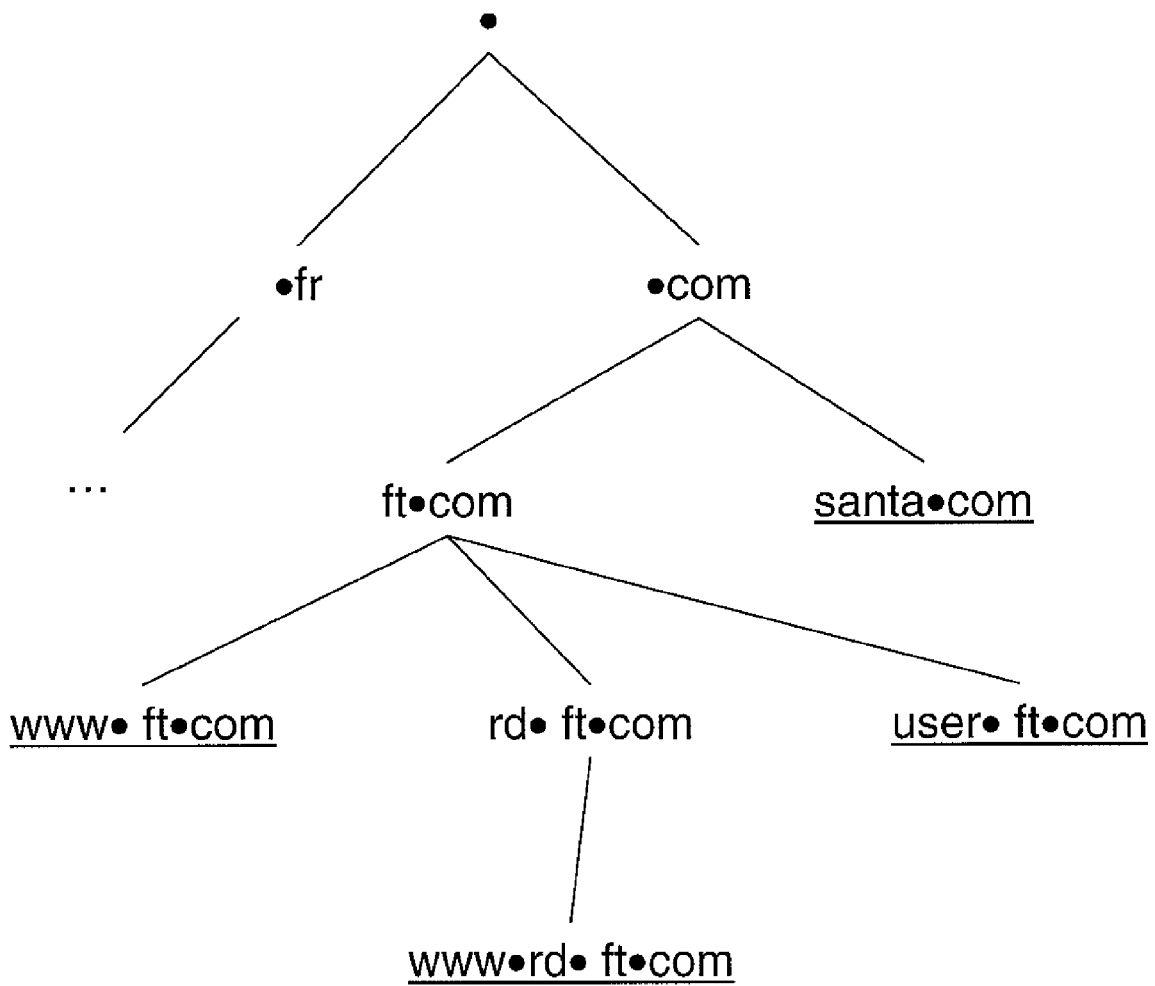

Appendix 3 represents the principal lines of a zone file of a child domain name server of a preferred embodiment the invention;

FIG. 1, already described, represents an example of a DNS domain tree known to the person skilled in the art;

FIG. 2 represents a telecommunications network including a parent domain name server of the invention and two partition servers;

FIG. 3 is a flowchart representing the principal steps of a preferred domain name management method of the invention; and FIG. 4 is a flowchart representing the principal steps of a preferred method of the invention for obtaining data.

DETAILED DESCRIPTION OF AN EMBODIMENT OF THE INVENTION

FIG. 2 represents a telecommunications network 1 and a domain name server ns1 managing a domain (or zone) z1.com.

As mentioned above, to implement the invention, this zone z1.com is divided into subzones. A partitioning rule is used for this, which in the present example distributes the names of the subdomains of the domain z1.com as follows:
 subdomain names in which the first letter is from a to m are hosted by the child server ns1-part1; and
 subdomain names in which the first letter is from n to z are hosted by the child server ns1-part2.

Accordingly, when a client CL1 interrogates the parent server ns1 to obtain DNS data relating to the subdomain domain2.z1.com, the client receives, in response to this query, useful information that redirects it to the partition server ns1-part1, since the first letter of the name of this subdomain (domain2.z1.com) is the letter d, which lies between the letters a and m.

For the client CL1 and for each of the domain name servers ns1, ns1-part1, and ns1-part2, FIG. 2 shows means 10 for receiving and sending data over the telecommunications network 1, consisting for example of a network card associated with drivers managing the HyperText Transfer Protocol (HTTP) and conventional computer processor means 20, namely a processor, a memory containing computer programs, and a random access memory for temporarily storing variables needed to execute the programs.

The processor means 20 of the server ns1 are adapted to execute the instructions of a computer program implementing the principal steps E10 to E50 of the management method of the invention shown in FIG. 3.

Similarly, the processor means 20 of the client device CL1 are adapted to execute the instructions of a computer program implementing the principal steps F10 to F30 of the method of the invention for obtaining DNS data shown in FIG. 4.

It is assumed that, using the communication means 10, the client CL1 sends (step F10 in FIG. 4) a query to the domain name server ns1 at IP address 10.193.161.50 to obtain the IP address of the subdomain domain2.z1.com, also denoted IP(domain2.z1.com).

This query can be of the following type, for example:

DIG 10.193.161.50 +norecurse domain2.z1.com, DIG (Domain Information Groper) being a tool known to the person skilled in the art for interrogating domain name servers in the DNS architecture.

The receiver means 10 of the domain name server ns1 receive this query in the step E10 in FIG. 3.

The person skilled in the art will realize that, the DIG command containing no type, the data that the client is looking for is data of type A, namely the IP address of the domain2.z1.com.

Following the step E10 of receiving the query from the client CL1, the name processor means 20 of the server ns1 read in a step E20 the zone file FZ1.zone defining the management of the zone z1.com by that server ns1.

This zone file FZ1.zone can be stored in a memory 30 of the server ns1, for example. It can also be stored in another machine.

Appendix 1 shows the principal lines of this zone file FZ1.zone.

Lines conforming to the DNS standard and known to the person skilled in the art are not described here.

This file includes lines L9 and L10 including the identifiers ns1-part1 and ns1-part2 of the partition servers that manage the DNS data of the zone z1.com.

The person skilled in the art will realize that, in line L9, the address of the server ns1-part1.z1.com on the network 1 is 10.193.161.73 (field A) and that server 1 is an alias (field CNAME) of the partition server ns1-part2.z1.com, the address of that partition server on the network 1 being 10.193.161.30, as indicated in line L11.

Moreover, lines L6 and L7 of the zone file FZ1.zone include a partitioning rule for redirecting the client CL1, in this example:

to the server ns1-part1.z1.com for any query to obtain data associated with a subdomain whose first letter is from a to m; and to the server ns1-part2.z1.com for the others.

To be more precise, the field "regexp" contains a regular expression for which the query sent by the client must be substituted. This result therefore constitutes the next query to be sent by the client.

According to the invention, the regular expression consists of a test used afterwards to indicate the name of the server that is hosting the required data.

Appendix 2 shows the principal lines of a zone file FZ1a.zone of the server ns1 of a second embodiment of the invention.

Only lines L6 and L7 differ from the zone file FZ1.zone of Appendix 1.

This zone file differs from the previous one in that the redirection indication is placed in the field "regexp", the replacement field being empty.

Alternatively, it could also be decided to specify a new service, to prevent any interpretation of the nature of the partitioning rule (here "service" refers to the logic that the client must adopt in order to resolve the query correctly). Accordingly, by choosing Domain to Name Server (D2NS) acronym, the Naming Authority Pointer (NAPTR) would be as follows:

|     | class | type  | flags | service | regexp              | replacement |
|-----|-------|-------|-------|---------|---------------------|-------------|
| ns1 | IN    | NAPTR | "a"   | "D2NS"  | "!^[a-m] !ns1-part1.z1.com.!" |             |

The "service" field is defined in RFC 3403. It is a character string that enables the client to identify the processing it must carry out. In this variant, the service D2NS is introduced in order to advise the client how the fields of the rule set out in the NAPTR field must be interpreted.

Alternatively, it could equally be decided to specify the name of the partitioning rule as an argument of the function of the service, in order to prevent any interpretation of the nature of the partitioning rule. Thus by choosing Domain to Name Server (D2NS) acronym, the field NAPTR would be as follows:

| class | type  | flags | service    | regexp              | replacement |
|-------|-------|-------|------------|---------------------|-------------|
| IN    | NAPTR | "a"   | "D2NS!ns1!"| "!^[a-m] !ns1-part1.z1.com.!" |             |

Alternatively, it could equally be decided to specify the name of the partitioning rule in the field "regexp", to prevent any interpretation of the nature of the partitioning rule. Thus by choosing Domain to Name Server (D2NS) acronym, the NAPTR field would be as follows, for example:

| class | type  | flags | service    | regexp                    | replacement |
|-------|-------|-------|------------|---------------------------|-------------|
| IN    | NAPTR | "a"   | "D2NS!ns1!"| "!^[a-m] !\\:ns1-part1.z1.com.!" |        |

The benefit of not giving the rule name as the domain name is that this guarantees that all the rules will be at the root of the zone and prevents incorrect interpretation of the domain name relating to the rule.

It is therefore preferable for the client to be able to determine whether the name to which the NS-type field refers is a domain name or a partitioning rule.

The benefit of showing the rule as a domain name is that this specifies the name of the domain for the next interrogation. Conventionally, the next interrogation relates to the field with the type A. In the invention, this interrogation relates to the NAPTR type field.

In the standard DNS, the field ns of the server managing the partitions points to a domain name that a query relating to a field of type A must use. This no longer applies to zone files of the invention.

In the preferred embodiment of the invention described here, the field ns refers to an NAPTR type field containing the partitioning rules (L6 and L7).

a domain name beginning with the letter "r", the alias server1 can form part of the useful information for redirecting the client CL1 to the partition server hosting the data of this domain, namely ns1-part2.z1.com here.

In one preferred embodiment of the invention, the useful information for redirection also includes the IP address 10.193.161.30 of a partition server associated with one or more of the following: the partitioning rule L6, L7, the name ns1-part2 of the partition server or the alias server1 of that server.

Returning to FIG. 3, the name server ns1 sends a response including the useful information obtained in the steps E30 and E40 to the client CL1 in a step E50.

The client CL1 receives this response in a step F20 represented in FIG. 4.

To be more precise, the response to the query DIG mentioned above can take one of the following forms:

```
; <<>> DiG 9.3.1 <<>> domain.z1.com
;; global options: printcmd
;; Got answer:
;; ->>HEADER<<- opcode: QUERY, status: NOERROR, id: 21511
;; flags: qr rd ra; QUERY: 1, ANSWER: 1, AUTHORITY: 4, ADDITIONAL: 4
;; QUESTION SECTION:
;domain.z1.com.              IN    A
;; ANSWER SECTION:
domain.z1.com.       300     IN    A     212.78.202.252
;; AUTHORITY SECTION:
z1.com.              80394   IN    NS    ns1
;; ADDITIONAL SECTION:
         Class   type    order  pref  flags   service  regexp       replacement
ns1      IN      NAPTR   100    50    "a"     " "      "![a-m]"     ns1-part1.z1.com
ns1      IN      NAPTR   100    50    "a"     " "      "![n-z]"     ns1-part2.z1.com
ns1-part1.z1.com.  IN    A     10.193.161.73
ns1-part2.z1.com.  IN    CNAME     server1
server1            IN    A     10.193.161.30
;; Query time: 91 msec
;; SERVER: 10.193.117.254#53(10.193.117.254)
;; WHEN: Fri Apr 22 16:14:46 2005
;; MSG SIZE rcvd: 217
```

Of course, creating a new type of field could be envisaged instead of using the NAPTR field as described for this embodiment of the invention.

The fact that the field ns associated with the domain name z1.com does not point to a type A field is characteristic of a zone file of the invention.

The presence of partitioning rules is another.

In one preferred embodiment of the invention, the processor means 10 of the server ns1 are adapted to interpret (step E30) the regular expressions of lines L6 and L7 to obtain from the domain name domain2.z1.com the name ns1-part1 of the distribution server hosting the required DNS data.

Be this as it may, according to the invention, the processor means 10 of the server ns1 are adapted to obtain, in a step E40, useful information for redirecting the client CL1 to the partition server ns1-part1.

This useful information can be of various types.

For example, it can include the partitioning rule L6, L7.

The useful information obtained by the server ns1 can also include the name of the partition server (ns1-part1.z1.com).

It can further include an alias of the server. Accordingly, assuming that the client CL1 interrogates the server ns1 using According to the invention, the processor means 20 of the client device CL1 are adapted to interpret the partitioning rule L6, L7 contained in the response, if necessary.

Here, the client device CL1 determines from this interpretation that the name of the partition server containing the required data is ns1-part1.

Be this as it may, the useful information for redirection contained in the response is processed by the client CL1 which recognizes that it must interrogate the server ns1-part1.z1.com to obtain the IP address of the domain domain2.z1.com.

To this end it sends (step F10) a query that is received in a step E10 by the communication means 20 of the child server ns1-part1.

The zone file FZ1-part1.zone that manages the partition of the server ns-part1 is set out in Appendix 3.

On reception of this query, the child server ns-part 1 reads (step E20) the zone file FZ1-part1.zone and obtains (step E40) the address 10.193.161.33 of the domain domain2.z1.com (see line L.13 of Appendix 3).

This address is sent to the client CL1 in the step E50.

In the embodiment of the invention described here, the zone file FZ1.part1.zone of the child server ns1-part1 also includes information for redirecting the client CL1 if its has interrogated the server ns1-part1 by mistake, for example to obtain data associated with a subdomain name beginning, for example, with the letter t.

In that case, the child server ns-part1 sends information enabling the client CL1 to interrogate the right server, namely ns1-part2.

In this case the response of the server ns1-part1 is preferably in the form:

| | | | | | | | | |
|---|---|---|---|---|---|---|---|---|
| z1.com. | | IN | ns | ns1 | | | | |
| | Class | type | order | pref | flags | service | regexp | Replacement |
| ns1 | IN | NAPTR | 100 | 50 | "a" | "D2NS" | "!^[a-m]" | ns1-part1.z1.com. |
| ns1 | IN | NAPTR | 100 | 50 | "a" | "D2NS" | "!^[n-z]" | ns1-part2.z1.com. |
| ns1-part1.z1.com. | | IN | A | 10.193.161.73 | | | | |
| ns1-part2.z1.com. | | IN | A | 10.193.161.30 | | | | |

Note that this is an abnormal situation, as the client has acquired the partitioning rule before interrogating the partition server, because the rule has been communicated to it.

APPENDIX 1

| | | | | | | | | | |
|---|---|---|---|---|---|---|---|---|---|
| FZ1.zone | | | | | | | | | |
| $TTL | 86400 | | | | | | | //L1 | |
| z1.com. | | IN | SOA | localhost.root.localhost { } | | | | //L2 | |
| z1.com. | | IN | ns | ns1 | | | | //L3 | |
| z1.com | | IN | ns | ns0 | | | | //L4 | |
| | class | type | order | pref | flags | service | regexp | replacement | //L5 |
| ns1 | IN | NAPTR | 100 | 50 | "a" | " " | "!^[a-m]" | ns1-part1.z1.com | //L6 |
| ns1 | IN | NAPTR | 100 | 50 | "a" | " " | "!^[n-z]" | ns1-part2.z1.com | //L7 |
| ns1-part1.z1.com. | IN | A | 10.193.161.73 | | | | | //L9 | |
| ns1-part2.z1.com. | IN | CNAME | server1 | | | | | //L10 | |
| server1 | | IN | A | 10.193.161.30 | | | | //L11 | |
| ns0 | | IN | A | 10.193.161.30 | | | | //L12 | |

APPENDIX 2

| | | | | | | | | | |
|---|---|---|---|---|---|---|---|---|---|
| FZ1a.zone | | | | | | | | | |
| $TTL | 86400 | | | | | | | //L1 | |
| z1.com. | | IN | SOA | localhost.root.localhost { } | | | | //L2 | |
| z1.com. | | IN | ns | ns1 | | | | //L3 | |
| z1.com | | IN | ns | ns0 | | | | //L4 | |
| | class | type | order | pref | flags | service | regexp | Replacement | //L5 |
| ns1 | IN | NAPTR | 100 | 50 | "a" | "D2NS" | "!^[a-m] | !ns1-part1.z1.com.!" | //L6 |
| ns1 | IN | NAPTR | 100 | 50 | "a" | " " | "!^[n-z] | !ns1-part2.z1.com.!" | //L7 |
| ns1-part1.z1.com. | IN | A | 10.193.161.73 | | | | | //L9 | |
| ns1-part2.z1.com. | IN | CNAME | server1 | | | | | //L10 | |
| server1 | | IN | A | 10.193.161.30 | | | | //L11 | |
| ns0 | | IN | A | 10.193.161.30 | | | | //L12 | |

APPENDIX 3

| | | | | | | | | | |
|---|---|---|---|---|---|---|---|---|---|
| FZ1-part1.zone | | | | | | | | | |
| $TTL | 86400 | | | | | | | //L1 | |
| z1.com. | | IN | SOA | localhost.root.localhost { | | | | //L2 | |
| | | | | } | | | | //L3 | |
| z1.com. | | IN | ns | ns1 | | | | //L4 | |
| | class | type | order | pref | flags | service | regexp | Replacement | //L5 |
| ns1 | IN | NAPTR | 100 | 50 | "a" | "D2NS" | "!^[a-m]" | ns1-part1.z1.com | //L6 |
| ns1 | IN | NAPTR | 100 | 50 | "a" | "D2NS" | "!^[n-z]" | ns1-part2.z1.com | //L7 |
| ns1-part1.z1.com | IN | A | 10.193.161.73 | | | | | //L9 | |
| ns1-part2.z1.com | IN | A | 10.193.161.30 | | | | | //L10 | |
| $ORIGIN z1.com | | | | | | | | | |
| domain1 | | IN | A | 10.193.161.31 | | | | //L12 | |
| domain2 | | IN | A | 10.193.161.33 | | | | //L13 | |

The invention claimed is:

1. A server of a first domain in a telecommunications network adapted to manage DNS queries relating to said first domain, said server being configured to receive from a client device a DNS query seeking to obtain DNS data of the first domain, wherein said server comprises:
   a zone file containing a partitioning rule defining a partitioning of a set of subdomains of said first domain into subzones, the DNS data of each of said subzones being hosted by a corresponding partition server of a plurality of partition servers, wherein the partition servers belong to said first domain so that said partition servers and said server which receives a DNS query from a client device are at the same level in the domain hierarchy; and
   a processor configured to obtain, from said zone file, information to identify the corresponding partition server to respond to said DNS query based on the partitioning rule;
   wherein said server is configured to send said information to the client device in response to said DNS query.

2. A server according to claim 1, wherein said information includes at least one of the following:
   said partitioning rule accompanied by the names or aliases of said partition servers;
   the name of said partition server; and
   an alias of said partition server.

3. A server according to claim 2, wherein said information further includes an address of said partition server.

4. A server according to claim 1, wherein said partitioning rule is a regular expression for obtaining an address of said partition server.

5. A non-transitory computer-readable medium having a zone file stored thereon and which is accessible by a server of a first domain in a telecommunications network, wherein said zone file comprises:
   instructions defining a rule for partitioning the set of the subdomains of said first domain into subzones; and
   instructions including identifiers of a plurality of partition servers each hosting the DNS data of a corresponding one of said subzones based on the rule, wherein the partition servers belong to said first domain so that said partition servers and said server of said first domain are at the same level in the domain hierarchy.

6. A method of managing DNS queries relating to a first domain in a telecommunications network, comprising:
   receiving by a server in said first domain a DNS query from a client device seeking to obtain DNS data of the first domain;
   reading a zone file including a partitioning rule defining a partitioning of a set of subdomains of said domain into subzones, the DNS data of each of said subzones being hosted by a corresponding partition server of a plurality of partition servers, wherein said partition servers and said server which receives a DNS query from a client device are at the same level in the domain hierarchy;
   obtaining, from said zone file, information to identify the corresponding partition server to respond to said DNS query based on the partitioning rule; and
   sending said information to said client device in response to said query.

7. A non-transitory computer-readable medium having a computer program stored thereon, said computer program including instructions which perform the management method according to claim 6 when said program is executed by a processor.

8. A data processing system client of a server of first domain names in a telecommunications network
   wherein said data processing system client is configured to send said server a DNS query seeking to obtain DNS data of the first domain, wherein the data processing system comprises a processor configured to interpret a regular expression received in response to said DNS query, the interpretation enabling said data processing system to obtain the name of a corresponding partition server, of a plurality of partition servers, to respond to said DNS query, wherein said server of said first domain names and said partition servers are at the same level in the domain hierarchy.

9. A method of obtaining DNS data of a first domain in a telecommunications network, comprising:
   sending a DNS query seeking to obtain said DNS data to a server in said telecommunications network, and
   interpreting, using a hardware device, a regular expression received in response to said DNS query and obtaining from the interpretation the name of a corresponding partition server, of a plurality of partition servers, to respond to said query, wherein the partition servers and said server which receives said DNS query are at the same level in the domain hierarchy.

10. A non-transitory computer-readable medium having a computer program stored thereon, said computer program including instructions which perform the method according to claim 9 when said program is executed by a processor.

* * * * *

UNITED STATES PATENT AND TRADEMARK OFFICE
CERTIFICATE OF CORRECTION

| | |
|---|---|
| PATENT NO. | : 9,130,990 B2 |
| APPLICATION NO. | : 12/300939 |
| DATED | : September 8, 2015 |
| INVENTOR(S) | : Daniel Migault |

It is certified that error appears in the above-identified patent and that said Letters Patent is hereby corrected as shown below:

IN THE SPECIFICATION

In column 8 at line 61, Change "ns-part1" to --ns1-part1--.

In column 8 at line 62, Change "ns-part 1" to --ns1-part1--.

In column 10 at line 1, Change "ns-part1" to --ns1-part1--.

Signed and Sealed this
Twenty-ninth Day of March, 2016

Michelle K. Lee
*Director of the United States Patent and Trademark Office*